United States Patent
Sano et al.

(10) Patent No.: US 6,419,733 B1
(45) Date of Patent: Jul. 16, 2002

(54) INK COMPOSITION

(75) Inventors: Tsuyoshi Sano; Kiyohiko Takemoto; Kazuaki Watanabe, all of Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/496,936

(22) Filed: Feb. 2, 2000

Related U.S. Application Data

(63) Continuation-in-part of application No. 09/269,386, filed as application No. PCT/JP98/03352 on Jul. 28, 1998, now abandoned.

(30) Foreign Application Priority Data

| Jul. 28, 1997 | (JP) | 9-201237 |
| Oct. 8, 1997 | (JP) | 9-275821 |

(51) Int. Cl.[7] ............................................. C09D 11/00
(52) U.S. Cl. ................. 106/31.86; 106/31.72; 106/31.89
(58) Field of Search .................... 106/31.86, 31.72, 106/31.89

(56) References Cited

U.S. PATENT DOCUMENTS

| 5,879,439 A | * | 3/1999 | Nagai et al. | 106/31.28 |
| 5,938,830 A | * | 8/1999 | Kuo et al. | 106/31.75 |
| 5,948,155 A | * | 9/1999 | Yui et al. | 106/31.58 |
| 5,954,866 A | * | 9/1999 | Ohta et al. | 106/31.89 |
| 5,990,227 A | * | 11/1999 | Takizawa et al. | 524/517 |
| 6,015,455 A | * | 1/2000 | Yano et al. | 106/31.58 |
| 6,022,403 A | * | 2/2000 | Kuo | 106/31.86 |
| 6,030,441 A | * | 2/2000 | Kubota et al. | 106/31.75 |
| 6,033,463 A | * | 3/2000 | Yui et al. | 106/31.27 |
| 6,043,297 A | * | 3/2000 | Sano | 523/160 |
| 6,075,069 A | * | 6/2000 | Takemoto | 523/160 |
| 6,080,229 A | * | 6/2000 | Watanabe et al. | 106/31.43 |
| 6,084,619 A | * | 7/2000 | Takemoto et al. | 347/96 |
| 6,086,197 A | * | 7/2000 | Kubota et al. | 106/31.13 |
| 6,123,502 A | * | 10/2000 | Yatake | 106/31.86 |
| 6,153,001 A | * | 11/2000 | Suzuki et al. | 106/31.65 |
| 6,204,307 B1 | * | 3/2001 | Miyabayashi | 523/160 |

FOREIGN PATENT DOCUMENTS

| JP | 3157464 | 7/1991 |
| JP | 4359071 | 4/1992 |
| JP | 4359072 | 4/1992 |
| JP | 61936 | 1/1994 |
| JP | 6135006 | 5/1994 |
| JP | 726179 | 1/1995 |

OTHER PUBLICATIONS

English Abstract of JP 6–135006, May 1994.
English Abstract of JP 4–359072, Apr. 1992.
English Abstract of JP 4–359071, Apr. 1992.
English Abstract of JP 3–157464, Jul. 1991.
English Abstract of JP 6–1936, Jan. 1994.
English Abstract of JP 7–26179, Jan. 1995.

* cited by examiner

*Primary Examiner*—Helene Klemanski
*Assistant Examiner*—Veronica F. Faison
(74) *Attorney, Agent, or Firm*—Ladas & Parry

(57) ABSTRACT

An ink composition is disclosed which can realize an image possessing excellent rubbing/scratch resistance and color reproduction in color ink jet recording and has advantages as a superpenetrating ink composition. The ink composition comprises at least a specific colorant, water, a water-soluble dispersant, and a penetrant, wherein the penetrant is 0.1 to 5% by weight of an acetylene glycol compound and the water-soluble dispersant is a water-soluble styrene/(meth) acrylic acid resin in an amount of 0.1 to 1 part by weight on a solid basis based on the pigment. An ink set capable of forming an excellent color image in color ink jet recording is also disclosed which comprises an orange ink composition and/or a green ink composition in combination with a yellow ink composition, a magenta ink composition, and a cyan ink composition that have hitherto been used in the color ink jet recording. The ink set consists essentially of three ink compositions, a yellow ink composition, a magenta ink composition, and a cyan ink composition, and, in addition, an orange ink composition and/or a green ink composition.

21 Claims, 5 Drawing Sheets

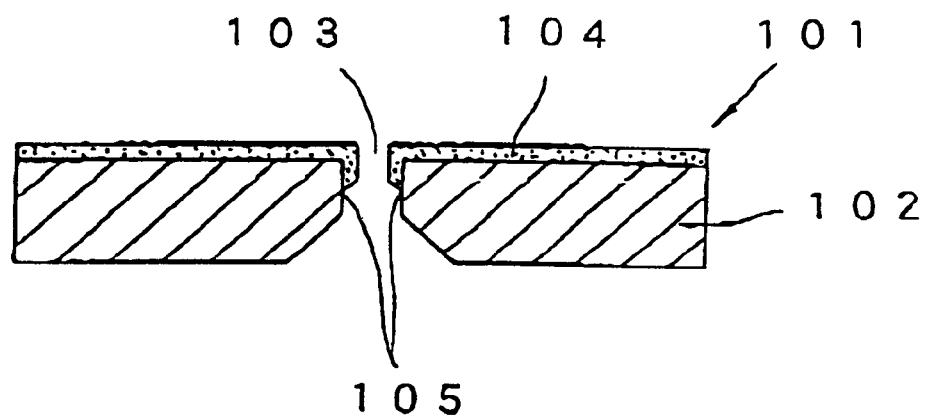
F I G. 7
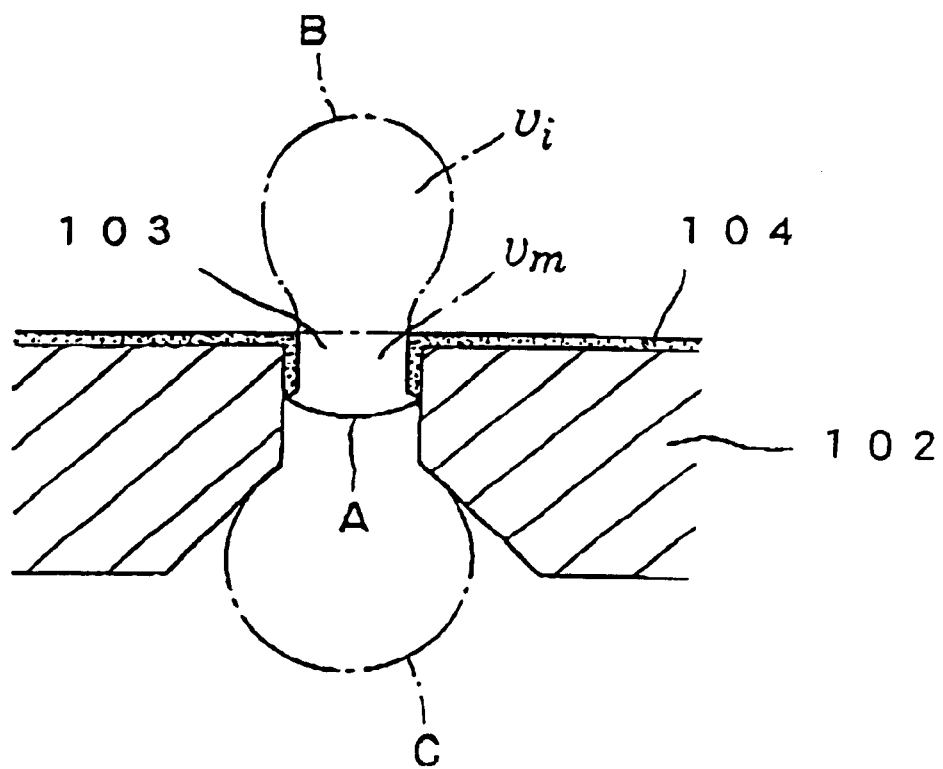
F I G. 8

INK COMPOSITION

This application is a continuation-in-part of application(s) application Ser. No. 09/269,386 filed on May 21, 1999 now abandoned which is, International Application PCT/JP98/03352 filed on Jul. 28, 1998 now abandoned and which designated the U.S., claims the benefit thereof and incorporates the same by reference.

BACKGROUND OF THE INVENTION

1. Field of the Invention

The present invention relates to ink compositions and an ink set comprising the same that can be preferably used in ink jet recording.

2. Background Art

Ink jet recording is a printing method wherein droplets of an ink composition are ejected and deposited onto a recording medium such as paper to conduct printing. This method has a feature that an image having high resolution and quality can be printed at a high speed by means of a relatively inexpensive apparatus.

In general, the ink composition used in the ink jet recording comprises water as a main component and, added thereto, a colorant and a wetting agent, such as glycerin, for preventing clogging and other purposes. Water-soluble dyes, by virtue of high chroma of the colorant, abundance in types of usable colorants, solubility in water and other advantageous properties, have been extensively used as the colorant in the ink composition for ink jet recording.

The dyes are, however, generally poor in lightfastness, waterfastness and other various properties. Therefore, prints obtained using dye ink compositions have poor lightfastness and wasterfastness. The waterfastness has been improved through the use of specialty recording papers having an ink absorptive layer for ink jet recording. For plain papers, however, the improvement in waterfastness is still unsatisfactory.

Pigments, as compared with the dyes, have superior lightfastness and waterfastness. This has recently led to studies on utilization of pigments as colorants in the ink composition for ink jet recording from the viewpoint of improving the lightfastness and waterfastness of printed images. Pigments are generally insoluble in water. Thus, when a pigment is used in a water-based ink composition, a method should be used which comprises mixing the pigment with a resin called a "dispersant" to prepare a mixture, stably dispersing the mixture in water, and then preparing an ink composition using the dispersion.

In order to stably disperse pigments in a water system, studies should be made on the kind and particle diameter of pigment, the kind of resin used, dispersing means and the like. Up to now, a large number of dispersing methods and inks for ink jet recording have been proposed in the art. For example, Japanese Patent Laid-Open No. 252467/1991 proposes an ink composition comprising water, a styrene/maleic acid copolymer, ε-caprolactam, and a pigment, and Japanese Patent Laid-Open No. 79680/1991 proposes an ink composition comprising an aqueous medium, a styrene/maleic acid copolymer, and a copper phthalocyanine pigment.

Further, for ink compositions comprising pigments as the colorant, a task to be accomplished is to improve the rubbing/scratch resistance of printed images. Unlike dyes penetrable into recording media, pigments stay on the surface of recording media, making it necessary to improve the rubbing/scratch resistance using some means.

When utilization of pigments as the colorant for inks for ink jet recording is considered, as compared with dyes, pigments have superior lightfastness and waterfastness, but on the other hand are smaller in number of kinds of usable colorants. In practical use of inks for ink jet recording, hue besides lightfastness and waterfastness should be sufficiently studied.

Furthermore, a proposal has been made for enhancing the penetration of the ink composition, shortening the drying time, and forming a large pixel (for example, a dot) using a smaller amount of the ink used. In pigment-based ink compositions, however, no satisfactory penetration is often provided due to the relation with the pigments and other ingredients.

On the other hand, regarding the ink jet recording method, the application of a polyvalent metal salt solution onto a recording medium followed by the application of an ink composition containing a dye having at least one carboxyl group has been recently proposed (for example, Japanese Patent Laid-Open No. 202328/1993). The claimed advantage of this method is that the polyvalent metal ion combines with the dye to form an insoluble complex, the presence of which can offer an image having waterfastness and high quality free from color bleeding.

Further, the use of a color ink comprising at least a surfactant for imparting a penetrating property or a solvent having a penetrating property and a salt in combination with a black ink capable of being thickened or agglomerated through the action of the salt has been proposed in the art (Japanese Patent Laid-Open No. 106735/1994). The claimed advantage of this method is that high-quality color images having high image density and free from color bleeding can be yielded. Specifically, an ink jet recording method has been proposed wherein two liquids, a first liquid containing a salt and a second liquid of an ink composition, are printed to realize good images.

In recent years, formation of color images by ink jet recording using a plurality of color ink compositions has been performed in the art. Color images are generally performed using three colors of a yellow ink composition, a magenta ink composition, and a cyan ink composition, and, in some cases, four colors of the above three color compositions plus a black ink composition. What is required of ink compositions for the formation of such color images is that they as such can exhibit good color development and, in addition, when used in combination with a plurality of ink compositions, can develop good intermediate colors.

SUMMARY OF THE INVENTION

The present inventors have now found that an ink composition comprising a specific pigment in combination with specific other ingredients can realize an image possessing excellent rubbing/scratch resistance and color reproduction in color ink jet recording and has advantages as a superpenetrating ink composition. The present invention has been made based on such finding.

It is an object of the present invention to provide as the first aspect of the present invention cyan, magenta, yellow, and black ink compositions and orange and green ink compositions that have good lightfastness and waterfastness and at the same time can realize good images, especially images having good hue.

The cyan, magenta, yellow, and black ink compositions according to one aspect of the present invention are an ink composition comprising at least a colorant, water, a water-soluble dispersant, and a penetrant, the colorant comprising 2 to 4% by weight of C.I. Pigment Blue 15:3, 3 to 5% by weight of C.I. Pigment Red 122, 3 to 5% by weight of C.I. Pigment Yellow 74 or 128, 2 to 5% by weight of carbon black, and C.I. Pigment Orange 43 or 36, or C.I. Pigment Green 7 or 36, the penetrant being 0.1 to 5% by weight of an acetylene glycol compound, the water-soluble dispersant being a water-soluble styrene/(meth)acrylic acid resin in an amount of 0.1 to 1 part by weight on a solid basis based on the pigment.

The ink composition of the present invention can realize images having excellent rubbing/scratch resistance and color reproduction. In color printing using ink compositions, in general, a yellow ink composition, a magenta ink composition, a cyan ink composition, and optionally a black ink composition are used with controlled amount of deposition to reproduce colors. Color reproduction is influenced by the kind of the pigment, the concentration of the pigment, and the kind, amount and the like of ingredients of the ink composition other than the colorant, for example, a dispersant. In color printing, especially ink jet recording, using the conventional pigment-based ink composition, the color reproduction is inferior to that in the case of dye-based ink compositions and hence has been required to be improved for practical use. By contrast, the ink composition of the present invention can offer color reproduction equal to the dye-based ink composition despite the fact that the pigment is used as the colorant. Further, the ink composition of the present invention has advantages as a superpenetrating ink composition. Specifically, the drying time is short, and a large pixel (dot) can be formed in a smaller amount of the ink used.

The present inventors have further found that use of an orange ink composition and/or a green ink composition in combination with a yellow ink composition, a magenta ink composition, and a cyan ink composition, which have hitherto been used in color ink jet recording, can provide better color images. They have also found that a combination of color ink compositions using specific pigments can realize better color images. The present invention has been made based on such finding.

Accordingly, it is another object of the present invention to provide as the second aspect of the present invention a color ink set that can realize good color images, especially images having good hue in ink jet recording.

The ink set for ink jet recording according to the second aspect of the present invention consists essentially of three ink compositions, a yellow ink composition, a magenta ink composition, and a cyan ink composition, and, in addition, an orange ink composition and/or a green ink composition.

BRIEF DESCRIPTION OF THE DRAWINGS

FIG. 7 is a diagram showing a nozzle plate of the ink jet recording head which is preferably used for ejecting the ink composition of the present invention; and FIG. 8 is an enlarged view showing the nozzle plate of FIG. 7.

DETAILED DESCRIPTION OF THE INVENTION

Figure 1:
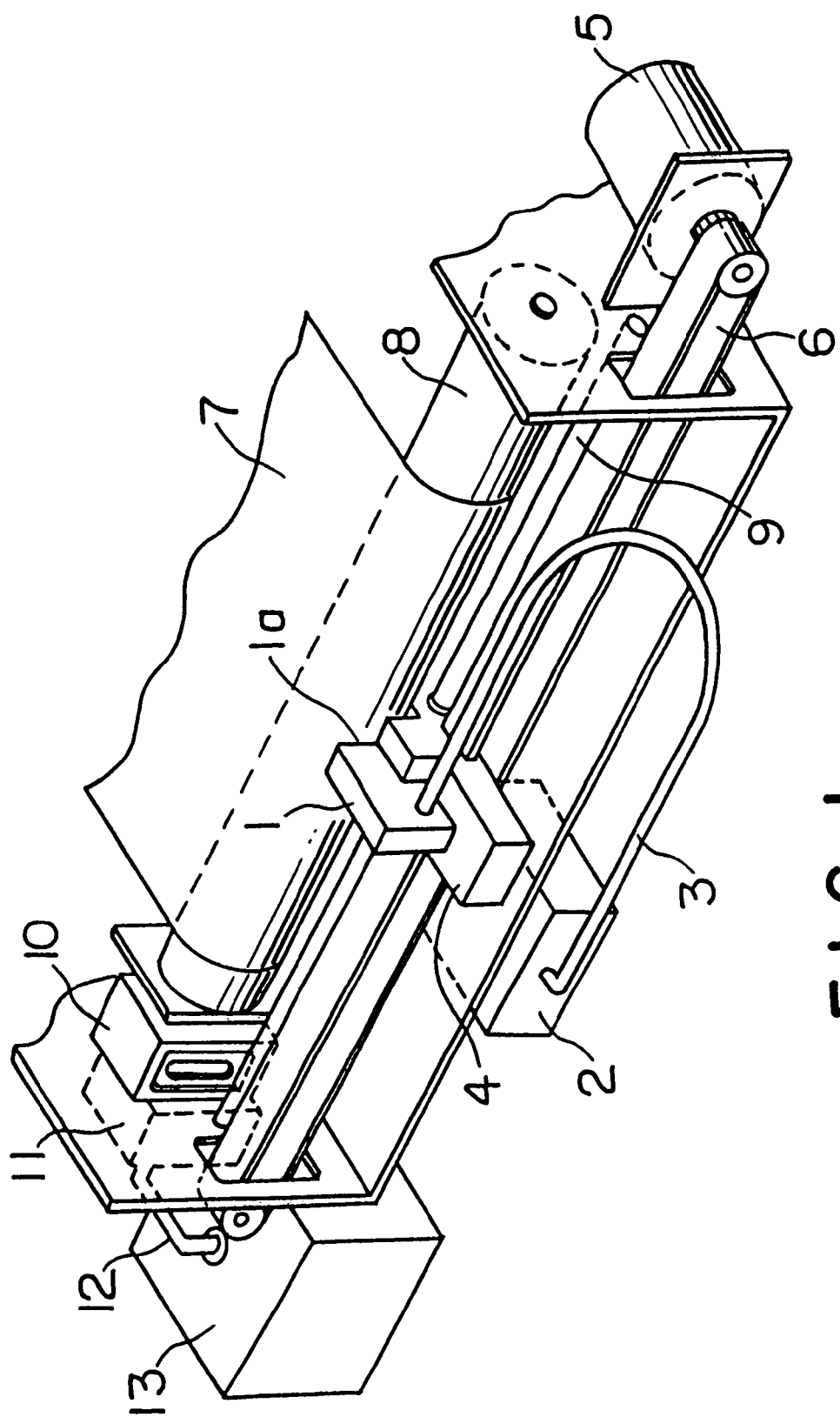
FIG. 1 is a diagram showing a preferred ink jet recording apparatus usable in practicing the ink jet recording method according to the present invention, wherein a recording head is provided separately from an ink tank to feed an ink composition and a reaction solution into a recording head through an ink tube.

Ink Composition According to First Aspect of the Invention

The ink composition according to the first aspect of the present invention may be used in recording methods using an ink composition. Recording methods using an ink composition include, for example, an ink jet recording method, a recording method using writing utensils, such as pens, and other various printing methods. Particularly preferably, the ink composition according to the present invention is used in the ink jet recording method.

The ink composition according to the first aspect of the present invention basically comprises at least a colorant, water, a water-soluble dispersant, and a penetrant.

According to the present invention, the cyan ink composition contains 2 to 4% by weight of C.I. Pigment Blue 15:3 as the colorant, the magenta ink composition contains 3 to 5% by weight of C.I. Pigment Red 122 as the colorant, the yellow ink composition contains 3 to 5% by weight of C.I. Pigment Yellow 74 or 128 as the colorant, the black ink composition contains 2 to 5% by weight of carbon black as the colorant, the orange ink composition contains C.I. Pigment Orange 43 or 36 (preferably 2 to 5% by weight) as the colorant, and the green ink composition contains C.I. Pigment Green 7 or 36 (preferably 2 to 5% by weight) as the colorant.

The ink composition according to the present invention contains 0.1 to 5% by weight of an acetylene glycol compound as the penetrant. Specific examples of preferred acetylene glycol compounds include compounds represented by the following formula (I):

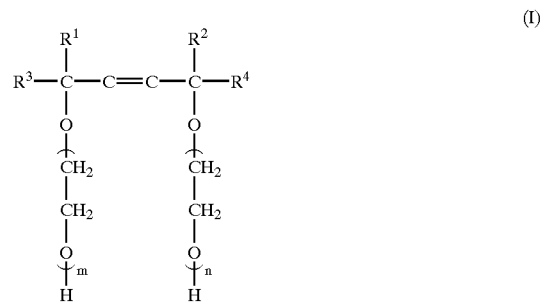

wherein $0 \leq m+n \leq 50$ and $R^1$, $R^2$, $R^3$, and $R^4$ each independently represent an alkyl group.

Commercially available products may be used as the compound represented by the formula (I). Specific examples thereof include OLFINE Y and Surfynol 82, 440, 465, and 485, (all the above products being manufactured by Air Products and Chemicals Inc.). They may be added alone or in combination of two or more.

Further, the ink composition of the present invention contains a water-soluble styrene/(meth)acrylic acid resin as the water-soluble dispersant in an amount of 0.1 to 1 part by weight, preferably 0.3 to 1 part by weight, on a solid basis based on the pigment. The styrene/(meth)acrylic acid copolymer should be soluble in water. The molecular weight thereof is preferably about 1,000 to 15,000, more preferably about 3,000 to 10,000. The ratio of the moiety derived from the styrene monomer to the moiety derived from (meth) acrylic acid may be determined using an acid value as an index. Thus, according to a preferred embodiment of the present invention, the acid value of the resin is preferably about 50 to 200, more preferably about 70 to 150.

According to a preferred embodiment of the present invention, the ink composition of the present invention further comprises 1 to 15% by weight of an alkyl ether derivative, with 3 or more carbon atoms, of a polyhydric alcohol. Specific examples of alkyl ether derivatives of polyhydric alcohols usable herein include diethylene glycol monobutyl ether, triethylene glycol monobutyl ether, propylene glycol monobutyl ether, and dipropylene glycol monobutyl ether.

The ink composition of the present invention preferably contains an organic solvent. The organic solvent is preferably a low-boiling organic solvent, and preferred examples thereof include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time taken for drying the ink composition.

According to a preferred embodiment of the present invention, the ink composition of the present invention further comprises a high-boiling organic solvent. Preferred examples of high-boiling organic solvents usable herein include polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, triethylene glycol monomethyl ether, and triethylene glycol monoethyl ether; urea; 2-pyrrolidone; N-methyl-2-pyrrolidone; and 1,3-dimethyl-2-imidazolidinone; and triethanolamine.

The amount of the low-boiling organic solvent added is preferably in the range of from 0.5 to 10% by weight, more preferably in the range of from 1.5 to 6% by weight, based on the ink composition. The amount of the high-boiling organic solvent added is preferably 0.5 to 40% by weight, more preferably 2 to 20% by weight, based on the ink composition.

According to a preferred embodiment of the present invention, the ink composition of the present invention contains a surfactant. Examples of preferred surfactants usable herein include anionic surfactants (for example, sodium dodecylbenzenesulfonate, sodium laurylate, and an ammonium salt of polyoxyethylene alkyl ether sulfates), nonionic surfactants (for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides). They may be used alone or in combination of two or more. Further, acetylene glycol (OLFINE Y and Surfynol 82, 104, 440, 465, and 485 (all the above products being manufactured by Air Products and Chemicals Inc.) may also used.

According to a preferred embodiment of the present invention, the ink composition of the present invention contains a resin emulsion. The term "resin emulsion" used herein refers to an emulsion comprising water as a continuous phase and the following resin component as a dispersed phase. Resin components as the dispersed prase include water-soluble (meth) acrylic resin, vinyl acetate resin, styrene/butadiene resin, vinyl chloride resin, (meth)acrylate/styrene resin, butadiene resin, styrene resin, crosslinked acrylic resin, crosslinked styrene resin, benzoguanamine resin, phenolic resin, silicone resin, and epoxy resin.

According to a preferred embodiment of the present invention, the resin is a polymer having a combination of a hydrophilic segment with a hydrophobic segment. The particle diameter of the resin component is not particularly limited so far as the resin component can form an emulsion. It, however, is preferably not more than about 150 nm, more preferably about 5 to 100 nm.

The resin emulsion may be prepared by dispersion polymerization of a resin monomer, optionally together with a surfactant, in water. For example, an emulsion of a water-soluble (meth)acrylic resin or a water-soluble styrene/(meth) acrylic resin may be prepared by subjecting an ester of (meth)acrylic acid or alternatively an ester of (meth)acrylic acid in combination with styrene to dispersion polymerization in water in the presence of a surfactant. In general, the mixing ratio of the resin component to the surfactant is preferably about 10:1 to 5:1. When the amount of the surfactant used falls within the above range, it is possible to provide an ink composition which has better waterfastness in the form of printed images and better penetrability. The surfactant used herein is not particularly limited, and preferred examples thereof include those described above as examples of preferred surfactants.

The ratio of the resin as the component constituting the dispersed phase to water is suitably 60 to 400 parts by weight based on 100 parts by weight of the resin with 100 to 200 parts by weight, based on 100 parts by weight of the resin, of water being preferred.

Known resin emulsions may also be used as the above resin emulsion. For example, resin emulsions described in Japanese Patent Publication No. 1426/1987 and Japanese Patent Laid-Open Nos. 56573/1991, 79678/1991, 160068/1991, and 18462/1992 as such may be used as the resin emulsion in the present invention.

Further, commercially available resin emulsions may also be used, and examples thereof include Microgel E-1002 and E-5002 (emulsion of water-soluble styrene/(meth)acrylic resin, manufactured by Nippon Paint Co., Ltd.), Voncoat 4001 (emulsion of water-soluble (meth)acrylic resin, manufactured by Dainippon Ink and Chemicals, Inc.), Voncoat 5454 (emulsion of water-soluble styrene/(meth)acrylic resin, manufactured by Dainippon Ink and Chemicals, Inc.), SAE-1014 (emulsion of water-soluble styrene/(meth)acrylic resin, manufactured by Nippon Zeon Co., Ltd.), and Saivinol SK-200 (emulsion of water-soluble (meth)acrylic resin, manufactured by Saiden Chemical Industry Co., Ltd).

In the cyan ink composition of the present invention, the amount of the resin emulsion incorporated therein is preferably such that the amount of the resin component is in the range of from 0.1 to 40% by weight, more preferably in the range of from 1 to 25% by weight, based on the ink composition. The resin emulsion has the effect of inhibiting the penetration of a coloring component and, further, accelerating the fixation on the recording medium. Further, some resin emulsions have an additional effect that they form a film on the surface of ink images produced on the recording medium to improve the rubbing/scratch resistance of the prints.

According to a preferred embodiment of the present invention, the ink composition contains a thermoplastic resin in the form of a resin emulsion. In this case, the thermoplastic resin has a softening temperature of 50 to 250° C., preferably 60 to 200° C. The term "softening temperature" used herein refers to the lowest temperature among the glass transition point of the thermoplastic resin, the melting point of the thermoplastic resin, the temperature which brings the viscosity of the thermoplastic resin to $10^{11}$ to $10^{12}$ poises, the pour point of the thermoplastic resin, and the minimum film forming temperature (MFT) in the form of an emulsion of the thermoplastic resin. In the step of heating according to the method of the present invention, the recording medium is heated to at least the softening temperature of the thermoplastic resin.

Further, preferably, the thermoplastic resin, when heated at the softening or melting temperature or a higher temperature and then cooled, forms a strong film having waterfastness and rubbing/scratch resistance.

Specific examples of water-insoluble thermoplastic resins include, but are not limited to, polyacrylic acid, polymethacrylic acid, an ester of polymethacrylic acid, polyethylacrylic acid, a styrene/butadiene copolymer, polybutadiene, an acrylonitrile/butadiene copolymer, a chloroprene copolymer, a fluororesin, polyvinylidene fluoride, polyolefin resin, cellulose, a styrene/acrylic acid copolymer, a styrene/methacrylic acid copolymer, polystyrene, a styrene/acrylamide copolymer, polyisobutyl acrylate, polyacrylonitrile, polyvinyl acetate, polyvinyl acetal, polyamide, rosin resin, polyethylene, a polycarbonate, a vinylidene chloride resin, a cellulosic resin, a vinyl acetate resin, an ethylene/vinyl acetate copolymer, a vinyl acetate/(meth)acrylate copolymer, a vinyl chloride resin, polyurethane, and a rosin ester.

Specific examples of low-molecular weight thermoplastic resins include polyethylene wax, montan wax, alcohol wax, synthetic oxide wax, an α-olefin/maleic anhydride copolymer, animal and vegetable waxes such as carnauba wax, lanolin, paraffin wax, and microcrystalline wax.

According to a preferred embodiment of the present invention, the ink composition of the present invention contains an inorganic oxide colloid (known also as "inorganic oxide sol"). In the present invention, the inorganic oxide colloid refers to a colloidal solution comprising: a dispersion medium composed of water or a combination of water and an organic solvent having good compatibility with water; and a dispersoid composed of ultrafine particles of an inorganic oxide. Inorganic oxides usable herein include, but are not limited to, high-molecular weight silicic anhydride ($SiO_2$) and alumina ($Al_2O_3$). The particle diameter of the ultrafine particles of the inorganic oxide is generally about 1 to 100 nm, preferably 1 to 20 nm, more preferably 1 to 10 nm. The dispersion medium for the inorganic oxide colloid is generally water or a mixed solvent composed of water and an organic solvent having good compatibility with water, for example, methanol, ethanol, isopropyl alcohol, or n-propanol. The inorganic oxide colloid is prepared by dispersing ultrafine particles of the inorganic oxide into water or the above organic solvent. A dispersion of the ultrafine particles of the inorganic oxide in water is called an "aqueous sol," and a dispersion of the ultrafine particles of the inorganic oxide in an organic solvent is called an "organosol."

The inorganic oxide colloid may be a commercially available one, and specific examples thereof include: Snowtex S, Snowtex N, Snowtex C, Snowtex SS, Snowtex XS, Snowtex 20, Snowtex 30, and Snowtex 40, manufactured by Nissan Chemical Industry Ltd., Cataloid SI-350, Cataloid SI-500, Cataloid SI-30, Cataloid S-20L, Cataloid S-20H, Cataloid S-30L, Cataloid S-30H, and Cataloid SI-40, manufactured by E. I. du Pont de Nemours & Co.), which are dispersions of ultrafine particles of high-molecular weight silicic anhydride in water; Aluminasol 100, Aluminasol 200, and Aluminasol 520, manufactured by Nissan Chemical Industry Ltd., which are colloids as dispersions of ultrafine particles of alumina in water; and OSCAL-1432 (isopropyl alcohol sol, manufactured by Catalysts and Chemicals Industries Co., Ltd.) which is a dispersion of ultrafine particles of high-molecular weight silicic anhydride in an organic solvent. Most of the commercially available colloidal solutions of inorganic oxides have pH adjusted to the acidic or alkaline. This is because the pH region where the inorganic oxide colloid exists stably in the dispersed state is on the acidic or alkaline side. Therefore, when the addition of a commercially available inorganic oxide colloidal solution to the ink is contemplated, it should be made by taking into consideration the pH region, where the inorganic oxide colloid exists stably in the dispersed state, and the pH value of the ink.

The amount of the inorganic oxide colloid added may be suitably determined by taking into consideration the type and the agglomerates of the inorganic oxide. However, for example, it is preferably about 0.1 to 15% by weight, more preferably about 0.5 to 5.0% by weight, based on the ink composition. A plurality of inorganic oxide colloids may be added.

According to a preferred embodiment of the present invention, the cyan ink composition of the present invention contains a saccharide. Specific examples of saccharide usable herein include monosaccharide, disaccharides, oligosaccharides (including trisaccharides and tetrasaccharides), and other polysaccharides, preferably glucose, mannose, fructose, ribose, xylose, arabinose, galactose, aldonic acid, glucitol, sorbitol, maltose, cellobiose, lactose, sucrose, trehalose, and maltotriose. The term "polysaccharide" used herein means saccharides in the broad sense as including substances which exist widely in the world of nature, such as alginic acid, α-cyclodextrin, and cellulose.

Derivatives of these saccharides usable herein include reducing sugars of the above saccharides (for example, sugar alcohols represented by the general formula $HOCH_2(CHOH)_nCH_2OH$, wherein n is an integer of 2 to 5), oxidizing sugars (for example, aldonic acid or uronic acid), amino acids, and thiosugars. Among them, sugar alcohols are particularly preferred, and specific examples thereof include maltitol and sorbitol.

The content of the saccharide is suitably 0.1 to 40% by weight, preferably 0.5 to 30% by weight, based on the ink composition.

If necessary, pH adjustors, preservatives, antimolds and the like may be added to the ink composition of the present invention.

Ink Set According To Second Aspect of the Present Invention

The ink set according to the second aspect of the present invention basically comprises a combination of a yellow ink composition, a magenta ink composition, a cyan ink composition, and, in addition, an orange ink composition and/or a green ink composition. The ink set of the present invention may optionally further comprise a black ink composition. However, any other color ink composition is not contained therein.

An ink set consisting of a yellow ink composition, a magenta ink composition, and a cyan ink composition is generally used in color ink jet recording. In this ink set, use of these ink compositions with an orange ink composition and/or a green ink composition can offer the following advantages.

According to the ink set of the present invention, the range of color reproduction of color images can be broadened.

Especially, the color reproduction of red color and green color can be improved. For images produced by conventional color ink jet recording, the chroma of red and the chroma of green are about 60 and about 70, respectively, whereas according to the ink set of the present invention, a chroma exceeding 70 can be realized with a chroma of not less than 80 being realized according to a preferred embodiment.

Further, the ink set of the present invention is advantageous in that expression of more subtle intermediate colors is possible. According to ink jet recording, color images are expressed by binary control wherein the ink composition is printed or is not printed. Therefore, the number of expressable colors is limited by the resolution. According to the present invention, the addition of the orange ink composition and/or the green ink composition can increase the degree of freedom in expression of intermediate colors and can markedly increase the number of expressable colors.

According to the ink set of the present invention, prints having good chroma and lightness can be obtained. Among others, even when pigments are used as the colorant, prints having good lightness and chroma can be obtained. In color printing, simultaneous printing of two or more color ink compositions is likely to result in lowered lightness of the printed area and lowered chroma. This tendency is more significant in ink compositions using dyes as the colorant than ink compositions using pigments as the colorant. According to the ink set of the present invention, however, images not inferior in chroma and lightness to those produced by independently using each of the ink compositions can be obtained.

According to a preferred embodiment of the present invention, an ink composition comprising C.I. Pigment Orange 43 or 36 as the orange pigment, an ink composition comprising C.I. Pigment Green 7 or 36 as the green pigment, an ink composition comprising C.I. Pigment Yellow 109, 110, 74, or 138 as the yellow pigment, an ink composition comprising C.I. Pigment Red 122, 202, or 209 as the magenta pigment, and an ink composition comprising C.I. Pigment Blue 15:3 as the cyan pigment are used in combination. Use of a combination of these colorants can offer an additional advantage of prints having higher chroma in addition to the above advantages. Ink compositions constituting the ink set according to this embodiment can satisfy properties required of ink compositions for ink jet recording, such as storage stability and clogging properties, on a high level.

The ink composition of the present invention comprises the above colorant and an aqueous solvent that can dissolve or disperse the colorant.

In the present invention, the pigment is preferably added as a a pigment dispersion obtained by dispersing a pigment in an aqueous medium with the aid of a dispersant or a surfactant. Preferred dispersants include dispersants commonly used in the preparation of pigments dispersions, for example, polymeric dispersants.

In the present invention, although the amount of the pigment added may be properly determined, the amount of orange pigment C.I. Pigment Orange 43 or 36 added is preferably about 2 to 5% by weight, the amount of green pigment C.I. Pigment Green 7 or 36 added is preferably about 2 to 5% by weight, the amount of yellow pigment C.I. Pigment Yellow 109, 110, 74, or 138 is preferably about 3 to 5% by weight, the amount of magenta pigment C.I. Pigment Red 122, 202, or 209 is preferably about 3 to 5% by weight, and the amount of cyan pigment C.I. Pigment Blue 15:3 is preferably about 2 to 4% by weight.

According to a preferred embodiment of the invention, the ink composition contains an organic solvent. The organic solvent is preferably a low-boiling organic solvent, and preferred examples thereof include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time taken for drying the ink composition.

According to a preferred embodiment of the present invention, the ink composition further comprises a high-boiling organic solvent. Preferred examples of high-boiling organic solvents usable herein include polyhydric alcohols such as ethylene glycol, diethylene glycol, triethylene glycol, polyethylene glycol, polypropylene glycol, propylene glycol, butylene glycol, 1,2, 6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; and 1,3-dimethyl-2-imidazolidinone; and triethanolamine.

The amount of the low-boiling organic solvent added is preferably in the range of from 0.5 to 10% by weight, more preferably in the range of from 1.5 to 6% by weight, based on the ink composition. The amount of the high-boiling organic solvent added is preferably 0.5 to 40% by weight, more preferably 2 to 20% by weight, based on the ink composition.

According to a preferred embodiment of the present invention, the ink composition contains a surfactant. Examples of preferred surfactants usable herein include anionic surfactants (for example, sodium dodecylbenzenesulfonate, sodium laurylate, and an ammonium salt of polyoxyethylene alkyl ether sulfates, nonionic surfactants (for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides). They may be used alone or in combination of two or more. Further, acetylene glycol (OLFINE Y and Surfynol 82, 104, 440, 465, and 485 (all the above products being manufactured by Air Products and Chemicals Inc.) may also be used.

According to a preferred embodiment of the present invention, the ink composition contains a resin emulsion.

The term "resin emulsion" used herein refers to an emulsion comprising water as a continuous phase and the following resin component as a dispersed phase. Resin components as the dispersed phase include acrylic resin, vinyl acetate resin, styrene/butadiene resin, vinyl chloride resin, (meth)acrylate/styrene resin, butadiene resin, styrene resin, crosslinked acrylic resin, crosslinked styrene resin, benzoguanamine resin, phenolic resin, silicone resin, and epoxy resin.

According to a preferred embodiment of the present invention, the resin is a polymer having a combination of a hydrophilic segment with a hydrophobic segment. The particle. diameter of the resin component is not particularly limited so far as the resin component can form an emulsion. It, however, is preferably not more than about 150 nm, more preferably about 5 to 100 nm.

The resin emulsion may be prepared by dispersion polymerization of a resin monomer, optionally together with a surfactant, in water. For example, an emulsion of acrylic resin or styrene/acrylic resin may be prepared by subjecting an ester of (meth)acrylic acid or alternatively an ester of (meth)acrylic acid in combination with styrene to dispersion polymerization in water in the presence of a surfactant. In general, the mixing ratio of the resin component to the surfactant is preferably about 10:1 to 5:1. When the amount of the surfactant used falls within the above range, it is possible to provide an ink composition which has better waterfastness in the form of printed images and better penetrability. The surfactant used herein is not particularly limited, and preferred examples thereof include those described above as examples of preferred surfactants.

The ratio of the resin as the component constituting the dispersed phase to water is suitably 60 to 400 parts by weight based on 100 parts by weight of the resin with 100 to 200 parts by weight, based on 100 parts by weight of the resin, of water being preferred.

Known resin emulsions may also be used as the above resin emulsion. For example, resin emulsions described in Japanese Patent Publication No. 1426/1987 and Japanese Patent Laid-Open Nos. 56573/1991, 79678/1991, 160068/1991, and 18462/1992 as such may be used as the resin emulsion in the present invention.

Further, commercially available resin emulsions may also be used, and examples thereof include Microgel E-1002 and E-5002 (emulsion of styrene/acrylic resin, manufactured by Nippon Paint Co., Ltd.), Voncoat 4001 (emulsion of acrylic resin, manufactured by Dainippon Ink and Chemicals, Inc.), Voncoat 5454 (emulsion of styrene/acrylic resin, manufactured by Dainippon Ink and Chemicals, Inc.), SAE-1014 (emulsion of styrene/acrylic resin, manufactured by Nippon Zeon Co., Ltd.), and Saivinol SK-200 (emulsion of acrylic resin, manufactured by Saiden Chemical Industry Co., Ltd).

According to the present invention, in the ink composition, the amount of the resin emulsion incorporated therein is preferably such that the amount of the resin component is in the range of from 0.1 to 40% by weight, more preferably in the range of from 1 to 25% by weight, based on the ink composition. The resin emulsion has the effect of inhibiting the penetration of a coloring component and, further, accelerating the fixation on the recording medium. Further, some resin emulsions have an additional effect that they form a film on the surface of ink images produced on the recording medium to improve the rubbing/scratch resistance of the prints.

According to a preferred embodiment of the present invention, the ink composition contains a saccharide. Specific examples of saccharides usable herein include monosaccharides, disaccharides, oligosaccharides (including trisaccharides and tetrasaccharides), and other polysaccharides, preferably glucose, mannose, fructose, ribose, xylose, arabinose, galactose, aldonic acid, glucitol, sorbitol, maltose, cellobiose, lactose, sucrose, trehalose, and maltotriose. The term "polysaccharide" used herein means saccharides in the broad sense as including substances which exist widely in the world of nature, such as alginic acid, α-cyclodextrin, and cellulose.

Derivatives of these saccharides usable herein include reducing sugars of the above saccharides (for example, sugar alcohols represented by the general formula $HOCH_2(CHOH)_nCH_2OH$, wherein n is an integer of 2 to 5), oxidizing sugars (for example, aldonic acid or uronic acid), amino acids, and thiosugars. Among them, sugar alcohols are particularly preferred, and specific examples thereof include maltitol and sorbitol.

The content of the saccharide is suitably 0.1 to 40% by weight, preferably 0.5 to 30% by weight, based on the ink composition.

If necessary, pH adjustors, preservatives, antimolds and the like may be added to the ink composition.

According to a preferred embodiment of the present invention, the ink compositions according to the first aspect of the present invention are used as the ink compositions constituting the ink set according to the second aspect of the present invention.

Ink Jet Recording Using Two Liquids

For the ink composition according to the first aspect of the present invention and the ink set according to the second aspect of the present invention, images may be formed by ink jet recording. However, combination thereof with the so-called "ink jet recording using two liquids" can provide better images. Specifically, good color development can be realized even on plain papers. Further, as compared with printed images produced by using the ink composition or the ink set alone, printed images produced by using the ink composition in combination with the ink jet recording using two liquids have improved lightfastness.

The ink jet recording method according to the present invention comprises the step of depositing a reactant-containing reaction solution and the cyan ink composition or the ink set as described above onto a recording medium to perform printing. In this case, the reactant is one that can break the state of dispersion and/or dissolution of the pigment to form an agglomerate.

In the recording method using two liquids like the ink jet recording method according to the present invention, the reaction solution is allowed to come into contact with the ink composition to produce good prints. Specifically, upon contact of the reaction solution with the ink composition, the reactant contained in the reaction solution breaks the state of dispersion of a pigment and other ingredients in the ink composition to form an agglomerate. The agglomerate is considered to deposit onto a recording medium to realize a print having high color density and suffering from no significant feathering and unevenness. Further in color images, uneven color-to-color intermixing in the region of boundary between different colors, that is, color bleeding, can be effectively prevented.

Thus, also in the present invention, the reaction solution is brought into contact with the ink composition. In this case, although the step of ejecting a droplet of the ink composition onto the recording medium to record an image may be carried out before or after the step of depositing the reaction solution onto the recording medium, this step is preferably carried out after the step of depositing the reaction solution onto the recording medium.

The deposition of the reaction solution onto the recording medium may be carried out by any of a method wherein the reaction solution is selectively deposited onto only an area where the ink composition is deposited, and a method wherein the reaction solution is deposited on the whole area of the paper. The former method is cost-effective because the consumption of the reaction solution can be minimized. In this method, however, the accuracy of the position at which both the reaction solution and the ink composition are deposited should be high to some extent. On the other hand, as compared with the former method, the accuracy of the position where the reaction solution and the ink composition are deposited is relaxed. In the latter method, however, a large amount of the reaction solution should be deposited on the whole area of the paper. This is likely to create curling of the paper at the time of drying. For this reason, the method used may be determined by taking a combination of the ink composition with the reaction solution into consideration. In the former method, the reaction solution can be deposited by ink jet recording.

The reaction solution used in the present invention comprises a reactant that can break the state of dispersion of the colorant and the like in the ink composition to agglomerate the colorant component and the like.

An example of the reaction solution usable in the present invention comprises a polyvalent metal salt, a polyamine, a polyamine derivative or the like as the reactant.

When the reactant is a polyvalent metal salt, a preferred example thereof is a salt that is constituted by divalent or higher polyvalent metallic ions and anions bonded to the polyvalent metallic ions and is soluble in water. Specific examples of polyvalent metallic ions include divalent metallic ions, such as $Ca^{2+}$, $Cu^{2+}$, $Ni^{2+}$, $Mg^{2+}$, $Zn^{2+}$, and $Ba^{2+}$, trivalent metallic ions, such as $Al^{3+}$, $Fe^{3+}$, and $Cr^{3+}$. Anions include $Cl^-$, $NO_3^-$, $I^-$, $Br^-$, $Clo_1^-$, and $CH_3COO^-$.

A metal salt constituted by $Ca^{2+}$ or $Mg^{2+}$ provides favorable results in terms of pH of the reaction solution and the quality of prints.

The concentration of the polyvalent metal salt in the reaction solution may be suitably determined so as to attain the effect of providing good print quality and preventing clogging. It, however, is preferably about 0.1 to 40% by weight, more preferably about 5 to 25% by weight.

According to a preferred embodiment of the present invention, the polyvalent metal salt is constituted by divalent or higher polyvalent metallic ions and nitrate ions or carboxylate ions bonded to the polyvalent metallic ions and is soluble in water.

In this case, preferably, the carboxylate ions are derived from a saturated aliphatic monocarboxylic acid having 1 to 6 carbon atoms and a carbocyclic monocarboxylic acid having 7 to 11 carbon atoms. Preferred examples of the saturated aliphatic monocarboxylic acid having 1 to 6 carbon atoms include formic acid, acetic acid, propionic acid, butyric acid, isobutyric acid, valeric acid, isovaleric acid, pivalic acid, and hexanoic acid. Among them, formic acid and acetic acid are particularly preferred.

A hydrogen atom(s) on the saturated aliphatic hydrocarbon residue in the monocarboxylic acid may be substituted by a hydroxyl group. Preferred examples of such carboxylic acids include lactic acid.

Preferred examples of the carbocyclic monocarboxylic acid having 6 to 10 carbon atoms include benzoic acid and naphthoic acid with benzoic acid being more preferred.

Preferred polyallylamine and polyallylamine derivative usable as the reactant are cationic polymers which are soluble in water and can be positively charged in water. Such polymers include, for example, those represented by the following formulae (a), (b), and (c):

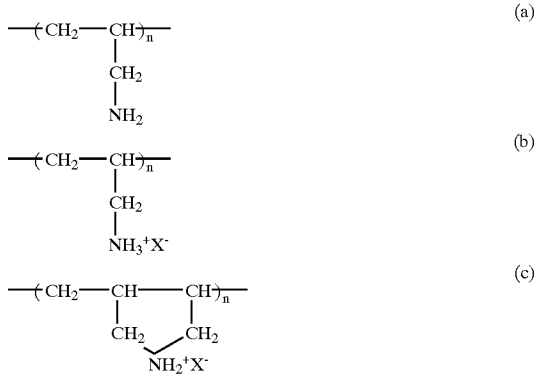

wherein $X^-$ represents chloride, bromide, iodide, nitrate, phosphate, sulfate, acetate or other ion.

In addition, a copolymer of an allylamine with a diallylamine and a copolymer of diallylmethylammmonium chloride with sulfur dioxide may also be used.

The content of the polyallylamine and the polyallylamine derivative is preferably 0.5 to 10% by weight based on the reaction solution.

According to a preferred embodiment of the present invention, the reaction solution comprises a wetting agent, such as a high-boiling organic solvent. The high-boiling organic solvent functions to prevent the reaction solution from drying out, thereby preventing clogging of the head. Preferred examples of high-boiling organic solvents usable herein, some of which are described above in connection with the polyol, include: polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea, 2-pyrrolidone, N-methyl-2-pyrrolidone, 1,3-dimethyl-2-imidazolidinone, and triethanolamine.

Although the amount of the high-boiling organic solvent added is not particularly limited, it is preferably about 0.5 to 40% by weight, more preferably about 2 to 20% by weight.

According to a preferred embodiment of the present invention, the reaction solution may further comprises a low-boiling organic solvent. Examples of preferred low-boiling organic solvents usable herein include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time taken for drying the ink composition. The amount of the low-boiling organic solvent added is preferably 0.5 to 10% by weight, more preferably 1.5 to 6% by weight.

According to a preferred embodiment of the present invention, the reaction solution may further comprise a penetrant. Penetrants usable herein include surfactants such as anionic, cationic, and amphoteric surfactants; alcohols such as methanol, ethanol, and iso-propyl alcohol; and lower alkyl ethers of polyhydric alcohols, such as ethylene glycol monomethyl ether, diethylene glycol monoethyl ether, diethylene glycol monobutyl ether, triethylene glycol monobutyl ether, propylene glycol monobutyl ether, and dipropylene glycol monobutyl ether.

An ink jet recording apparatus for carrying out the ink jet recording method according to the present invention will be described with reference to the accompanying drawings.

FIG. 1 is a diagram showing an embodiment of an ink jet recording apparatus. In this embodiment, an ink composition and a reaction solution are accommodated in a tank and fed into a recording head through an ink tube. Specifically, a recording head 1 is communicated with an ink tank 2 through an ink tube 3. In this case, the interior of the ink tank 2 is partitioned, and a chamber for an ink composition, optionally a plurality of chambers respectively for a plurality of color ink compositions, and a chamber for a reaction solution are provided.

The recording head 1 is moved along a carriage 4 by means of a timing belt 6 driven by a motor 5. On the other hand, paper 7 as a recording medium is placed by a platen 8 and a guide 9 at a position facing the recording head 1. In this embodiment, a cap 10 is provided. A suction pump 11 is connected to the cap 10 in order to conduct the so-called "cleaning operation." The ink composition sucked by the suction pump 11 is resorvoired in a waste ink tank 13 through a tube 12.

Figure 2:
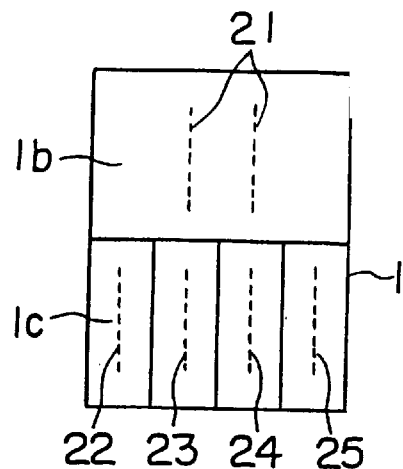
FIG. 2 is an enlarged view showing the surface of nozzles for a recording head, wherein reference character 1b designates the surface of a nozzle for a reaction solution and 1c the surface of a nozzle for an ink composition.

FIG. 2 is an enlarged view showing the surface of nozzles for the recording head 1. In the drawing, the surface of a nozzle for a reaction solution is indicated by 1b, and a nozzle 21 for ejecting the reaction solution is provided in the longitudinal direction. On the other hand, the surface of nozzles for the ink composition is indicated by 1c, and a yellow ink composition, a magenta ink composition, a cyan ink composition, and a black ink composition are ejected respectively through nozzles 22, 23, 24 and 25.

Figure 3:
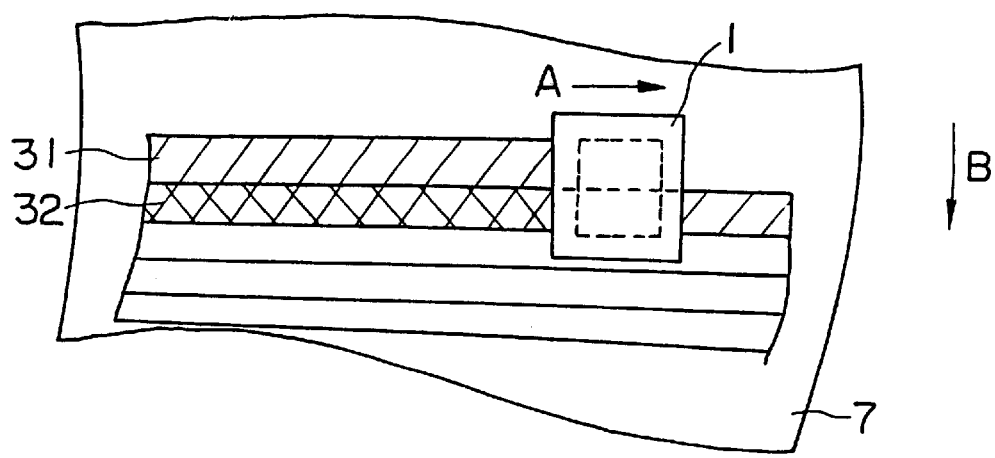
FIG. 3 is a diagram illustrating ink jet recording using the recording head shown in FIG. 2, wherein numeral 31 designates a region where a reaction solution has been deposited and numeral 32 a printed region where an ink composition has been printed on the deposited reaction solution.

Further, an ink jet recording method using the recording head shown in FIG. 2 will be described with reference to FIG. 3. The recording head 1 is moved in the direction indicated by an arrow A, during which time the reaction solution is ejected through the nozzle surface 1b to form a reaction solution-deposited region 31 in a band form on the recording medium 7. Subsequently, the recording medium 7 is transferred by a predetermined extent in the paper feed direction indicated by an arrow B, during which time the recording head 1 is moved in the direction opposite to that indicated by the arrow A in the drawing and returned to the left end of the recording medium 7, and the recording head 1 conducts printing using the ink composition on the reaction solution-deposited region, thereby forming a print region 32.

Figure 4:
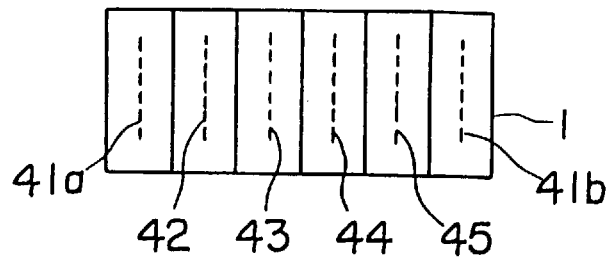
FIG. 4 is a diagram showing another preferred embodiment of the recording head usable in practicing the ink jet recording method according to the present invention, wherein all ejection nozzles are arranged in lateral direction.

Further, as shown in FIG. 4, in the recording head 1, it is also possible to arrange all nozzles in the lateral direction to construct a nozzle assembly. In the drawing, ejection nozzles for a reaction solution are denoted by 41a and 41b, and a yellow ink composition, a magenta ink composition, a cyan ink composition, and a black ink composition are ejected respectively through nozzles 42, 43, 44 and 45. In the recording head according to this embodiment, the recording head 1, when reciprocated on the carriage, can conduct printing in both directions. Therefore, in this case, printing at a higher speed is expected as compared with the case where the recording head shown in FIG. 2 is used.

Regulating the surface tension of the reaction solution and the ink composition preferably by the above method enables a high-quality print to be more stably provided independently of the order of depositing the reaction solution and the ink composition. In this case, use of only one ejection nozzle for the reaction solution suffices for desired results (for example, the nozzle indicated by numeral 41b in the drawing may be omitted), leading to a further reduction in size of head and an increase in printing speed.

In the ink jet recording apparatus, the supplement of the ink composition may be carried out by replacing a cartridge as an ink tank. The ink tank may be integral with the recording head.

Figure 5:
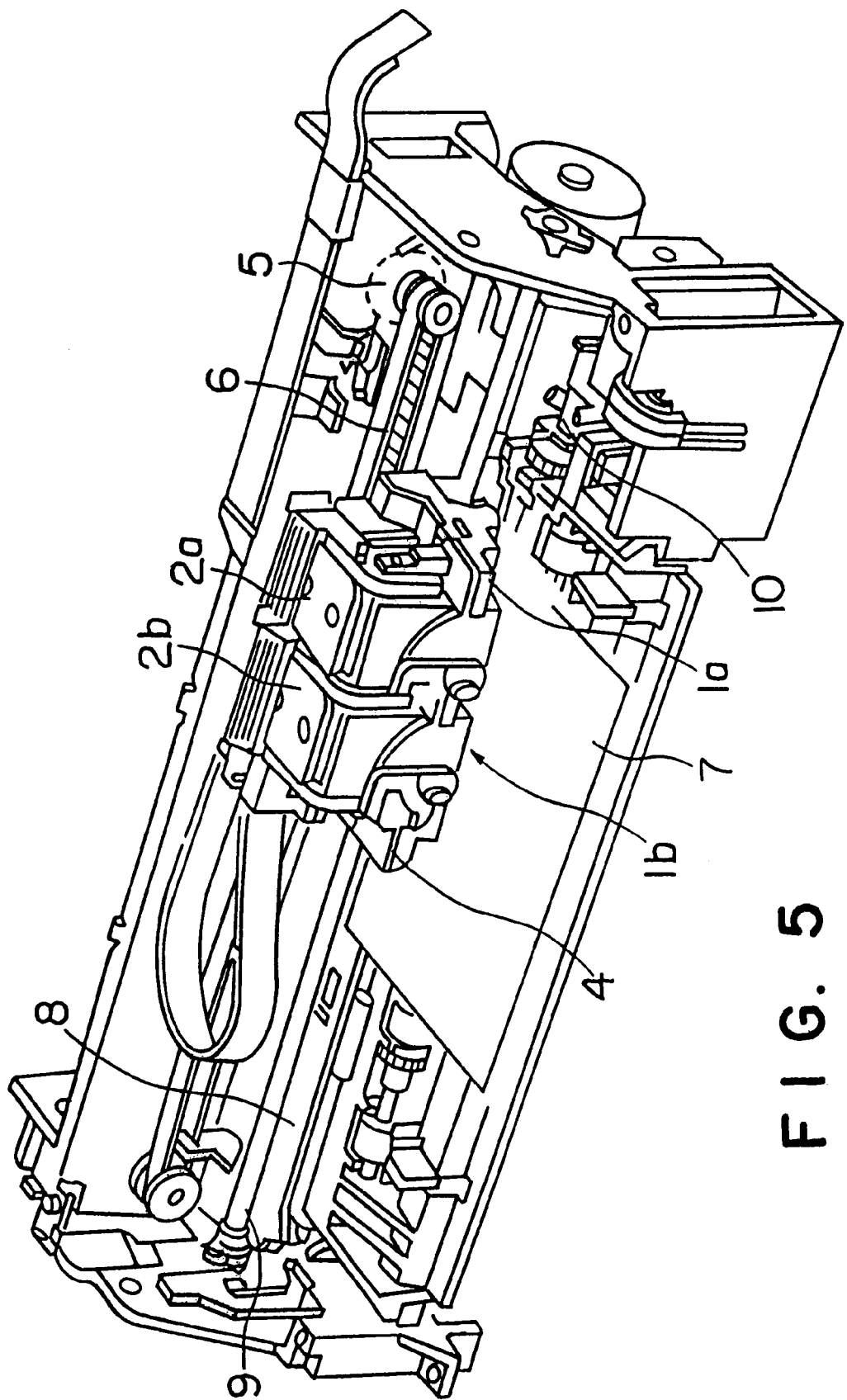
FIG. 5 is a diagram showing a preferred ink jet recording apparatus usable in practicing the ink jet recording method according to the present invention, wherein a recording head is integral with an ink tank.

A preferred embodiment of an ink jet recording apparatus using such an ink tank is shown in FIG. 5. In the drawing, the same members as used in the apparatus shown in FIG. 1 have the same reference numerals. In the embodiment shown in FIG. 5, recording heads 1a and 1b are integral respectively with ink tanks 2a and 2b. An ink composition and a reaction solution are ejected respectively through the recording heads 1a and 1b. Basically, printing may be conducted in the same manner as described above in connection with the apparatus shown in FIG. 1. Further, in this embodiment, the recording head 1a is moved together with the ink tank 2a on a carriage 4, while the recording head 1b is moved together with the ink tank 2b on the carriage 4.

Figure 6:
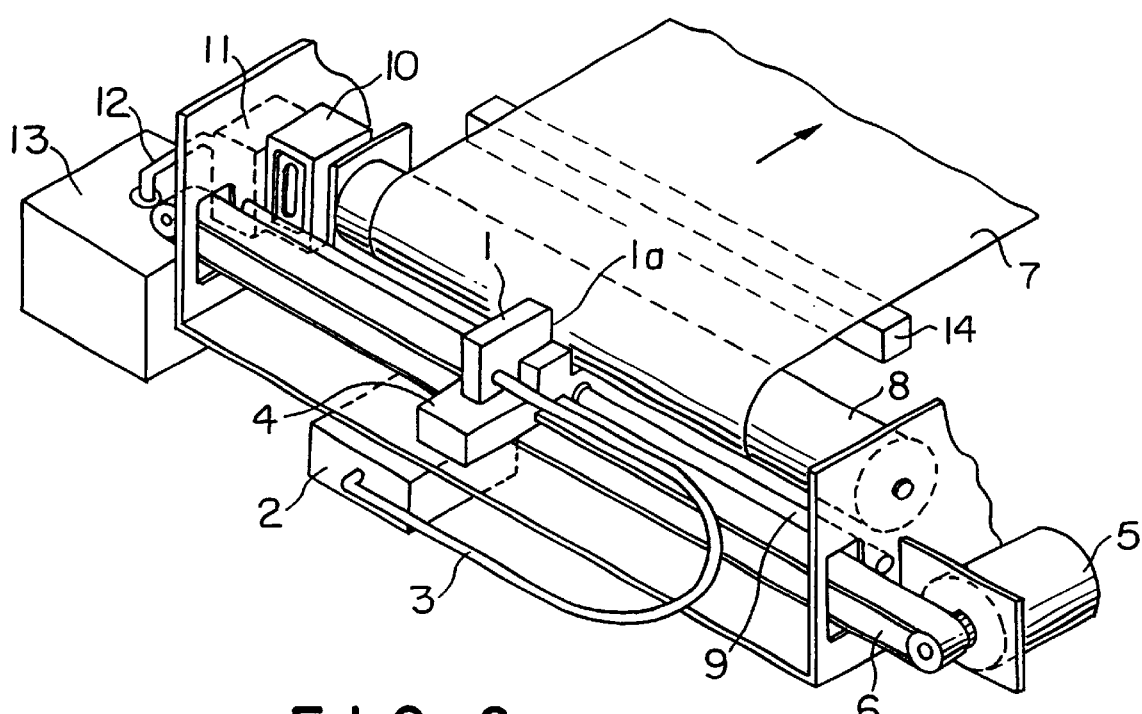
FIG. 6 is a diagram showing a preferred ink jet recording apparatus usable in practicing the ink jet recording method according to the present invention, wherein a heater is provided to heat a recording medium after printing.

A preferred embodiment of an ink jet recording apparatus wherein a heater for heating a printed recording medium is provided is shown in FIG. 6. The embodiment shown in FIG. 6 is the same as the embodiment shown in FIG. 1, except that a heater 14 is additionally provided. The heater 14 may be of a contact type wherein, in heating the recording medium, it is brought into contact with the recording medium. Alternatively, the heater 14 may be of a non-contact type where the recording medium is heated by applying infrared rays or the like or blowing hot air to the recording medium.

The ink composition according to the present invention is preferably used in an ink jet recording method using an ink jet recording head provided with a nozzle plate described in Japanese latent Laid-Open No. 125220/1995. The basic structure of this nozzle plate is as shown 7. In the nozzle plate 101, a nozzle 103 is provided in a substrate 102. An ink-repellent coating 104 is provided on the substrate 102 and extends along the internal surface of the nozzle 103 to a position 105 on the internal surface of the nozzle 103. FIG. 8 is an enlarged view of the nozzle plate 101, illustrating a portion around the nozzle 103. upon loading of the ink composition into the ink jet recording head provided with a nozzle plate having the above structure, a vibrating face of a meniscus of the ink composition is created which is in the form of a line connecting bottom edges 105 of the ink-repellent coating within the nozzle 103 to each other. The position of vibration center A is as shown in FIG. 8. In ejecting the ink composition, an ink droplet is ejected in such a form as indicated by B in FIG. 8 and then leaves the nozzle. After the ink ejection, the ink composition is once pulled back to a position indicated by C in FIG. 8. The ink composition, however, is soon returned to the vibration position A of the meniscus. In the nozzle plate described in this publication, the position of the bottom edge 105 of the ink-repellent coating is determined so that the space volume of the nozzle in its internal portion from the surface of the nozzle plate 101 to the vibration center A of the meniscus, Vm, is in the range of 0.05 to 0.50 based on the volume from the surface 104 of the nozzle 103 to the front face B of the ink just before the ejection, that is, the amount of the ink droplet ejected, Vi. According to a preferred embodiment of the present invention, the ink-repellent coating is formed by immersing a nozzle plate member in an electrolyte containing nickel ions and particles of a water-repellent polymeric resin, such as polytetrafluoroethylene, dispersed by charges, and forming a codeposit on the surface of the nozzle plate 1 while stirring the electrolyte. Fluoropolymeric materials usable in the codeposition include polytetrafluoroethylene, polyperfluoroalkoxybutadiene, polyfluorovinylidene, polyfluorovinyl, and polydiperfluoroalkyl fumarate. These resins may be used alone or as a mixture of two or more.

Therefore, according to one aspect of the present invention, there is provided an ink recording method, comprising the steps of: ejecting a droplet of an ink composition of the present invention and depositing the droplet onto a recording medium, wherein the ink composition is ejected thorough a nozzle plate, and the nozzle plate has, on its surface, an ink-repellent coating a part of which extends along the inner surface of the nozzle to such an extent that the space volume of the nozzle in its internal portion from the surface of the nozzle plate to a meniscus forming face is in the range of 0.05 to 0.50 based on the amount of the ink ejected.

EXAMPLES

Example A

Preparation of Pigment Ink Compositions

Pigment ink compositions having the following respective compositions were produced according to the following procedure. At the outset, the pigment and the dispersant resin were mixed together, and the mixture, together with glass beads (diameter: 1.7 mm, amount; 1.5 times (by weight) larger than the mixture), was dispersed for 2 hr in a sand mill (manufactured by Yasukawa Seisakusho). Thereafter, the glass beads were removed, the other additives were added, and the mixture was stirred at room temperature for 20 min. The mixture was filtered through a 5 μm membrane filter to prepare an ink composition.

Example A1

C.I. Pigment Cyan 15:3
2 wt %

| | |
|---|---|
| Styrene/acrylic acid copolymer | 1.5 wt % |
| (molecular weight 7,000, acid value 120) | |
| (solid basis) | |
| Sucrose | 0.7 wt % |
| Maltitol | 6.3 wt % |
| Glycerin | 10 wt % |
| Diethylene glycol | 3 wt % |
| 2-Pyrrolidone | 2 wt % |
| Surfynol 465 | 1 wt % |
| Pure water | Balance |

Example A2

C.I. Pigment Cyan 15:3
3.7 wt %

| | |
|---|---|
| Styrene/acrylic acid copolymer | 1.8 wt % |
| (molecular weight 7,000, acid value 150) | |
| (solid basis) | |
| Sucrose | 0.7 wt % |
| Maltitol | 6.3 wt % |
| Glycerin | 10 wt % |
| Triethylene glycol monobutyl ether | 5 wt % |
| Surfynol 465 | 1 wt % |
| Pure water | Balance |

Example A3

| | |
|---|---|
| C.I. Pigment Red 122 | 3 wt % |
| Styrene/acrylic acid copolymer | 1.2 wt % |
| (molecular weight 7,000, acid value 70) | |
| (solid basis) | |
| Sucrose | 0.7 wt % |
| Maltitol | 6.3 wt % |
| Glycerin | 10 wt % |
| Diethylene glycol | 3 wt % |
| Surfynol 465 | 1 wt % |
| Pure water | Balance |

Example A4

| | |
|---|---|
| C.I. Pigment Red 122 | 4.6 wt % |
| Styrene/acrylic acid copolymer | 2.2 wt % |
| (molecular weight 7,000, acid value 100) | |
| (solid basis) | |
| Sucrose | 0.3 wt % |
| Maltitol | 2.7 wt % |
| Glycerin | 15 wt % |
| Surfynol 465 | 1 wt % |
| Diethylene glycol monobutyl ether | 8 wt % |
| Pure water | Balance |

Example A5

C.I. Pigment Yellow 74
4.7 wt %

| | |
|---|---|
| Styrene/acrylic acid copolymer | 2.1 wt % |
| (molecular weight 7,000, acid value 90) | |
| (solid basis) | |
| Sucrose | 0.4 wt % |
| Maltitol | 3.6 wt % |
| Glycerin | 14 wt % |
| Diethylene glycol | 3 wt % |
| Surfynol 465 | 0.8 wt % |
| Pure water | Balance |

Example A6

C.I. Pigment Yellow 74
3 wt %

| | |
|---|---|
| Styrene/acrylic acid copolymer | 1.8 wt % |
| (molecular weight 7,000, acid value 130) | |
| (solid basis) | |
| Sucrose | 0.7 wt % |
| Maltitol | 6.3 wt % |
| Glycerin | 15 wt % |
| Surfynol 465 | 1 wt % |
| Triethylene glycol monobutyl ether | 5 wt % |
| Pure water | Balance |

Example A7

| | |
|---|---|
| Carbon black | 4.6 wt % |
| Styrene/acrylic acid copolymer | 2 wt % |

-continued

| | |
|---|---|
| (molecular weight 7,000, acid value 110) | |
| (solid basis) | |
| Sucrose | 0.6 wt % |
| Maltitol | 5.4 wt % |
| Glycerin | 10 wt % |
| 2-Pyrrolidone | 2 wt % |
| Surfynol 465 | 0.9 wt % |
| Pure water | Balance |

Example A8

| | |
|---|---|
| Carbon black | 2.5 wt % |
| Styrene/acrylic acid copolymer | 1 wt % |
| (molecular weight 7,000, acid value 100) | |
| (solid basis) | |
| Sucrose | 0.7 wt % |
| Maltitol | 6.3 wt % |
| Glycerin | 11 wt % |
| 2-Pyrrolidone | 2 wt % |
| Surfynol 465 | 0.9 wt % |
| Triethylene glycol monobutyl ether | 8 wt % |
| Pure water | Balance |

Example A9

| | |
|---|---|
| C.I. Pigment Green 7 | 3.5 wt % |
| Styrene/acrylic acid copolymer | 0.9 wt % |
| (molecular weight 10,000, acid value 150) | |
| (solid basis) | |
| Sucrose | 0.7 wt % |
| Maltitol | 6.3 wt % |
| Glycerin | 13 wt % |
| Diethylene glycol | 3 wt % |
| Surfynol 465 | 1 wt % |
| Pure water | Balance |

Example A10

| | |
|---|---|
| C.I. Pigment Green 7 | 3.1 wt % |
| Styrene/acrylic acid copolymer | 1.1 wt % |
| (molecular weight 3,000, acid value 70) | |
| (solid basis) | |
| Sucrose | 0.5 wt % |
| Maltitol | 4.5 wt % |
| Glycerin | 15 wt % |
| Surfynol 465 | 1 wt % |
| Diethylene glycol monobutyl ether | 8 wt % |
| Pure water | Balance |

Example A11

| | |
|---|---|
| C.I. Pigment Green 7 | 2.8 wt % |
| C.I. Pigment Green 36 | 0.5 wt % |
| Styrene/acrylic acid copolymer | 1.0 wt % |
| (molecular weight 7,000, acid value 130) | |
| (solid basis) | |
| Sucrose | 0.4 wt % |
| Maltitol | 3.6 wt % |
| Glycerin | 14 wt % |
| Diethylene glycol | 3 wt % |

-continued

| | |
|---|---|
| Surfynol 465 | 0.8 wt % |
| Pure water | Balance |

Example A12

C.I. Pigment Orange 36

3.1 wt %

| | |
|---|---|
| Styrene/acrylic acid copolymer | 0.6 wt % |
| (molecular weight 5,000, acid value 90) | |
| (solid basis) | |
| Sucrose | 0.7 wt % |
| Maltitol | 6.3 wt % |
| Glycerin | 12 wt % |
| Diethylene glycol | 3 wt % |
| Surfynol 465 | 1 wt % |
| Pure water | Balance |

Example A13

C.I. Pigment Orange 36

2.8 wt %

C.I. Pigment Orange 43

0.6 wt %

| | |
|---|---|
| Styrene/acrylic acid copolymer | 0.6 wt % |
| (molecular weight 8,000, acid value 110) | |
| (solid basis) | |
| Sucrose | 0.7 wt % |
| Maltitol | 6.3 wt % |
| Glycerin | 10 wt % |
| Triethylene glycol monobutyl ether | 5 wt % |
| Surfynol 465 | 1 wt % |
| Pure water | Balance |

Example A14

| | |
|---|---|
| C.I. Pigment Yellow 128 | 4.0 wt % |
| Styrene/acrylic acid copolymer | 1.5 wt % |
| (molecular weight 7,000, acid value 130) | |
| (solid basis) | |
| Sucrose | 0.7 wt % |
| Maltitol | 6.3 wt % |
| Glycerin | 10 wt % |
| Diethylene glycol | 3 wt % |
| Surfynol 465 | 1 wt % |
| Triethylene glycol monobutyl ether | 5 wt % |
| Pure water | Balance |

Comparative Example A1

C.I. Pigment Blue 15:3

2.5 wt %

Acrylic acid copolymer 0.1 wt %

(molecular weight 7,000, acid value 150) (solid basis)

| | |
|---|---|
| Sucrose | 0.7 wt % |
| Maltitol | 6.3 wt % |
| Glycerin | 14 wt % |
| Surfynol 465 | 1 wt % |
| Triethylene glycol monobutyl ether | 8 wt % |
| Pure water | Balance |

Comparative Example A2

| | |
|---|---|
| C.I. Pigment Red 122 | 3.1 wt % |
| Styrene/acrylic acid copolymer (molecular weight 7,000, acid value 130) (solid basis) | 1.3 wt % |
| Sucrose | 0.7 wt % |
| Maltitol | 6.3 wt % |
| Diethylene glycol | 4 wt % |
| Glycerin | 11 wt % |
| 2-Pyrrolidone | 2 wt % |
| Pure water | Balance |

Comparative Example A3

C.I. Pigment Yellow 138
3.3 wt %
Acrylic acid copolymer
1.3 wt %
(molecular weight 7,000, acid value 140) (solid basis)

| | |
|---|---|
| Sucrose | 0.3 wt % |
| Maltitol | 2.7 wt % |
| Glycerin | 10 wt % |
| Diethylene glycol | 2 wt % |
| Surfynol 465 | 0.9 wt % |
| Triethylene glycol monobutyl ether | 4 wt % |
| Pure water | Balance |

Comparative Example A4

| | |
|---|---|
| Carbon black | 1.5 wt % |
| Acrylic acid copolymer (molecular weight 7,000, acid value 160) (solid basis) | 0.9 wt % |
| Sucrose | 0.3 wt % |
| Maltitol | 2.7 wt % |
| Glycerin | 15 wt % |
| Diethylene glycol | 2 wt % |
| Pure water | Balance |

Evaluation Test on Ink Compositions

Prints obtained by printing the ink composition by means of an ink jet printer MJ-930C manufactured by Seiko Epson Corp. were evaluated. The printing was carried out at a density of 360 dpi×360 dpi with the weight of the ink ejected per dot being 0.040 μg.

Evaluation A1: Evaluation of hue of ink composition (single color)

A blotted image was printed on a specialty recording medium for ink jet recording (a specialty gloss film, manufactured by Seiko Epson Corp.). The color was measured with a Macbeth CE-7000 spectrophotometer (manufactured by Macbeth) to determine the coordinates of L*a*b* color system of the color difference indication method specified in CIE (Commission International de l'Eclairage). Separately, printing was carried out using genuine ink compositions for an ink jet printer MJ-930C. In this case, however, green color was realized by mixing a yellow ink composition and a cyan ink composition together in a ratio of 1:1. For colors of the prints thus obtained, the coordinates of L*a*b* color system of the color difference indication method specified in CIE were determined in the same manner as described above.

The chroma C* defined by the following equation was then determined. Further, the difference in chroma (ΔC*) defined by the following equation was determined. The results were evaluated according to the following criteria.

$$C^* = ((a^*)^{2} + (b^*)^2)^{1/2}$$

$$\Delta C^* = C^*(1) - C^*(2)$$

wherein C*(1) represents the chroma of an image obtained by the ink composition of the above example, and C*(2) represents the chroma of an image obtained by the genuine ink composition for the ink jet printer MJ-930C.

Evaluation criteria:
A: For all the colors, ΔC*>0 or |ΔC*|<5
B: For any one of the colors, ΔC*>−10
C: For all the colors, ΔC*<−10

Evaluation A2: Evaluation of dot diameter

A blotted image having a size of 50 points in length and 200 points in width was printed on the same specialty recording medium for ink jet recording as used in Evaluation A1, and the evenness thereof was evaluated. The results were evaluated according to the following criteria.

A: Even blotted image free from white streak
C: Harsh blotted image with white streak present on the whole blotted image Evaluation A3: Evaluation of fixation A blotted image and characters were printed on the same specialty recording medium for ink jet recording as used in Evaluation A1. The prints thus obtained were rubbed with a finger under an environment of temperature 25° C. and humidity 50%, and visually inspected for smearing of the print and separation of the colorant. The results were evaluated according to the following criteria.

A: Neither smearing of the print nor separation of colorant created
C: Both smearing of the print and separation of colorant created

TABLE 1

| | Results of evaluation | | |
|---|---|---|---|
| | Evaluation 1 | Evaluation 2 | Evaluation 3 |
| Ex. A1 | A | A | A |
| Ex. A2 | A | A | A |
| Ex. A3 | A | A | A |
| Ex. A4 | A | A | A |
| Ex. A5 | A | A | A |
| Ex. A6 | A | A | A |
| Ex. A7 | A | A | A |
| Ex. A8 | — | A | A |
| Ex. A9 | — | A | A |
| Ex. A10 | A | A | A |
| Ex. A11 | A | A | A |
| Ex. A12 | — | A | A |
| Ex. A13 | — | A | A |
| Comp. Ex. A1 | A | A | C |

TABLE 1-continued

Results of evaluation

|  | Evaluation 1 | Evaluation 2 | Evaluation 3 |
|---|---|---|---|
| Comp. Ex. A2 | A | C | A |
| Comp. Ex. A3 | C | A | C |
| Comp. Ex. A4 | — | C | C |

Evaluation A4: Evaluation of hue of orange ink composition

Prints were obtained in the same manner as in Evaluation A1, except that an orange ink composition and a yellow ink composition were mixed together in the following combination in a ratio of 1:1 to realize red. Reference red was obtained by mixing a yellow ink composition and a magenta ink composition as genuine ink compositions for MJ-930C together in a ratio of 1:1.

In the same manner as in Evaluation A1, the chroma C* of the prints was determined, and, in addition, the difference in chroma (ΔC*).

A combination of Example A12 with Example A5

A combination of Example A13 with Example A6

For reds obtained by any of the combinations, ΔC*>0 or |ΔC*|<5, indicating that the color reproduction is good.

Evaluation 4: Ejection Stability

By using MJ-930C, printing was continuously carried out for 48 hours with Inks of Examples A2, A6, A8, A13, and A14 and Comparative Examples A1 and A3. Less than 10 times of dropouts and scattering of the ink were observed for all of the ink compositions.

Example B

Example B1

The following pigments were dispersed in the following liquid medium to prepare an ink set comprising five color ink compositions.

| Pigment | |
|---|---|
| Orange ink: C.I. Pigment Orange 43 | 3 wt % |
| Green ink: C.I. Pigment Green 7 | 3 wt % |
| Yellow ink: C.I. Pigment Yellow 74 | 3.5 wt % |
| Magenta ink: C.I. Pigment Red 122 | 3 wt % |
| Cyan ink: C.I. Pigment Blue 15:3 | 2.0 wt % |
| Liquid medium | |
| Styrene/acrylic acid copolymer ammonium salt (molecular weight: 7000, dispersant) | 1.5 wt % |
| Grandoll PP-1000 (styrene/acrylic resin emulsion, resin component 45%, manufactured by Dainippon Ink and Chemicals, Inc.) | 7 wt % |
| Maltitol | 7 wt % |
| Glycerin | 10 wt % |
| 2-Pyrrolidone | 2 wt % |
| Ion-exchanged water | Balance |

Example B2

The following pigments were dispersed in the following liquid medium to prepare an ink set comprising five color ink compositions.

| Pigment | |
|---|---|
| Orange ink: C.I. Pigment orange 36 | 3 wt % |
| Green ink: C.I. Pigment Green 36 | 3 wt % |
| Yellow ink: C.I. Pigment Yellow 74 | 3.5 wt % |
| Magenta ink: C.I. Pigment Red 122 | 3 wt % |
| Cyan ink: C.I. Pigment Blue 15:3 | 2.0 wt % |
| Liquid medium | |
| Styrene/acrylic acid copolymer ammonium salt (molecular weight: 7000, dispersant) | 1.5 wt % |
| Grandoll PP-1000 (styrene/acrylic resin emulsion, resin component 45%, manufactured by Dainippon Ink and Chemicals, Inc.) | 7 wt % |
| Maltitol | 7 wt % |
| Glycerin | 10 wt % |
| 2-Pyrrolidone | 2 wt % |
| Ion-exchanged water | Balance |

Example B3

The following pigments were dispersed in the following liquid medium to prepare an ink set comprising five color ink compositions.

| Pigment | |
|---|---|
| Orange ink: C.I. Pigment Orange 43 | 3 wt % |
| Green ink: C.I. Pigment Green 7 | 3 wt % |
| Yellow ink: C.I. Pigment Yellow 109 | 3 wt % |
| : C.I. Pigment Yellow 110 | 0.5 wt % |
| Magenta ink: C.I. Pigment Red 122 | 3 wt % |
| Cyan ink: C.I. Pigment Blue 15:3 | 2.0 wt % |
| Liquid medium | |
| Styrene/acrylic acid copolymer ammonium salt (molecular weight: 7000, dispersant) | 1.5 wt % |
| Grandoll PP-1000 (styrene/acrylic resin emulsion, resin component 45%, manufactured by Dainippon Ink and Chemicals, Inc.) | 7 wt % |
| Maltitol | 7 wt % |
| Glycerin | 10 wt % |
| 2-Pyrrolidone | 2 wt % |
| Ion-exchanged water | Balance |

Example B4

The following pigments were dispersed in the following liquid medium to prepare an ink set comprising five color ink compositions.

| Pigment | |
|---|---|
| Orange ink: C.I. Pigment Orange 43 | 3 wt % |
| Green ink: C.I. Pigment Green 7 | 3 wt % |
| Yellow ink: C.I. Pigment Yellow 74 | 3.5 wt % |
| Magenta ink: c.I. Pigment Red 209 | 3 wt % |
| Cyan Thk: C.I. Pigment Blue 15 : 3 | 2 wt % |
| Liquid medium | |
| Styrenelacrylic acid copolymer ammonium salt (molecular weight: 7000, dispersant) | 1.5 wt% |
| Grandoll PP-1000 (styrene/acrylic resin emulsion, resin component 45%, manufactured by Dainippon Ink and Chemicals, Inc.) | 7 wt % |
| Maltitol | 7 wt % |
| Glycerin | 10 wt % |
| 2-Pyrrolidone | 2 wt % |
| Ion-exchanged water | Balance |

Comparative Example B1

An ink set not containing orange and green inks in Example B1 was provided.

Comparative Example B2

An ink set not containing orange and green inks in Example B3 was provided.

Comparative Example B3

An ink set not containing orange and green inks in Example B4 was provided.

The ink sets thus obtained were evaluated as follows.

Printing was performed on the following recording papers by means of an ink jet printer MJ-700V2C.

Evaluation paper:
(i) Gloss film for ink jet recording (manufactured by Seiko Epson Corp.)
(ii) Xerox P (manufactured by Xerox Corp.)
(iii) Xerox 4024 3R721 (manufactured by Xerox Corp.)
(iv) Neenah Bond (manufactured by Kimberly-Clark)

Evaluation B1: Color development of red

An orange ink composition and a yellow ink composition in the ink sets of Examples B1 to B4 were mixed together in a ratio of 1:1 to realize red.

A magenta ink composition and a yellow ink composition in the ink sets of Comparative Examples B1 to B3 were mixed together in a ratio of 1:1 to express red.

Colors of the prints were measured, and the results were evaluated according to the following criteria.

A: Chroma of not less than 80
B: Chroma of 70 to less than 80
C: Chroma of 60 to less than 70
D: Chroma of less than 60

Evaluation 2: Color development of green

A green ink composition and a yellow ink composition in the ink sets of Examples B1 to B4 were mixed together in a ratio of 1:1 to realize green.

A cyan ink composition and a yellow ink composition in the ink sets of Comparative Examples B1 to B3 were mixed together in a ratio of 1:1 to express green.

Colors of the prints were measured, and the results were evaluated according to the following criteria.

A: Chroma of not less than 80
B: Chroma of 70 to less than 80
C: Chroma of 60 to less than 70
D: Chroma of less than 60

The results were as summarized in the following table.

TABLE 2

|  | Evaluation B1 | Evaluation B2 |
| --- | --- | --- |
| EX. B1 | A | A |
| EX. B2 | A | A |
| Ex. B3 | B | B |
| Ex. B4 | A | A |
| Comp. Ex. B1 | C | C |
| Comp. Ex. B2 | D | C |
| Comp. EX. B3 | C | C |

What is claimed is:

1. An ink composition comprising a colorant, water, a water-soluble dispersant, and a penetrant,
the colorant being C.I. Pigment Orange 43 or 36, or C.I. Pigment Green 7 or 36,
the penetrant being 0.1 to 5% by weight of an acetylene glycol compound, the water-soluble dispersant being a water-soluble styrene/(meth)acrylic acid resin in an amount of 0.1 to 1 part by weight on a solid basis based on the pigment.

2. The ink composition according to claim 1, wherein the colorant is C.I. Pigment Orange 43 or 36.

3. The ink composition according to claim 1, wherein the colorant is C.I. Pigment Green 7 or 36.

4. The ink composition according to claim 1, which further comprises 1 to 15% by weight of an alkyl ether derivative, with 3 or more carbon atoms, of a polyhydric alcohol.

5. The ink composition according to claim 1, which further comprises a resin emulsion and/or an inorganic oxide colloid.

6. An ink set for ink jet recording consists essentially of three ink compositions, a yellow ink composition, a magenta ink composition, and a cyan ink composition, and, in addition, an orange ink composition and/or a green ink composition.

7. The ink set according to claim 6, which further comprises a black ink composition.

8. The ink set according to claim 6, wherein the yellow ink composition, the magenta ink composition, the cyan ink composition, the orange ink composition, and the green ink composition as the colorant are a yellow pigment, a magenta pigment, a cyan pigment, an orange pigment, and a green pigment, respectively.

9. The ink set according to claim 8, wherein the orange pigment is C.I. Pigment Orange 43 or 36,
the green pigment is C.I. Pigment Green 7 or 36,
the yellow pigment is C.I. Pigment Yellow 109, 110, 74, or 138,
the magenta pigment is C.I. Pigment Red 122, 202, or 209, and
the cyan pigment is C.I. Pigment Blue 15:3.

10. The ink set according to claim 9, wherein the ink composition further comprises 0.1 to 5% by weight of an acetylene glycol compound as a penetrant and 0.1 to 1 part by weight, on a solid basis based on the pigment, of a water-soluble styrene/(meth)acrylic acid resin as a water-soluble dispersant.

11. The ink set according to claim 10, wherein the ink composition comprises a resin emulsion.

12. An ink jet recording method comprising the steps of: ejecting a droplet of an ink composition; and depositing the droplet onto a recording medium to perform printing, wherein the ink composition is an ink composition according to claim 1.

13. An ink jet recording method comprising the step of depositing a reactant-containing reaction solution and an ink composition onto a recording medium to perform printing, wherein
the ink composition is an ink composition according to claim 1, and
the reactant can break the state of dispersion and/or dissolution of the pigment.

14. The method according to claim 13, wherein the reactant is a polyvalent metal salt and/or a polyallylamine.

15. The method according to claim 14, wherein the polyvalent metal salt is a nitrate or a carboxylate.

16. A record printed by the method according to claim 12.

17. An ink recording method comprising the steps of: ejecting a droplet of an ink composition of claim 1, and depositing the droplet onto a recording medium, wherein the ink composition is ejected thorough a nozzle plate, and the nozzle plate has, on its surface, an ink-repellent coating a part of which extends along the inner surface of the nozzle to such an extent that the space volume of the nozzle in its internal portion from the surface of the nozzle plate to a meniscus forming face is in the range of 0.05 to 0.50 based on the amount of the ink ejected.

18. The ink composition according to claim 2, wherein the colorant is C.I. Pigment Orange 43.

19. The ink composition according to claim 2, wherein the colorant is C.I. Pigment Orange 36.

20. The ink composition according to claim 3, wherein the colorant is C.I. Pigment Green 7.

21. The ink composition according to claim 2, wherein the colorant is C.I. Pigment Green 36.

* * * * *